US007525218B2

United States Patent
Togashi

(10) Patent No.: US 7,525,218 B2
(45) Date of Patent: Apr. 28, 2009

(54) UNINTERRUPTIBLE POWER SUPPLY, UNINTERRUPTIBLE POWER SUPPLY SYSTEM AND SHUTDOWN PROCESSING PROGRAM PRODUCT

(75) Inventor: Fujitaka Togashi, Tokyo (JP)

(73) Assignee: Densei-Lambda K.K., Tokyo (JP)

( * ) Notice: Subject to any disclaimer, the term of this patent is extended or adjusted under 35 U.S.C. 154(b) by 267 days.

(21) Appl. No.: 11/681,854

(22) Filed: Mar. 5, 2007

(65) Prior Publication Data

US 2007/0210650 A1    Sep. 13, 2007

(30) Foreign Application Priority Data

Mar. 10, 2006    (JP)    .............................. 2006/065665

(51) Int. Cl.
*H02J 7/00*    (2006.01)
(52) U.S. Cl. ........................................ 307/65
(58) Field of Classification Search .................... 307/65
See application file for complete search history.

(56) References Cited

U.S. PATENT DOCUMENTS

| | | | |
|---|---|---|---|
| 4,611,289 A | 9/1986 | Coppola | |
| 4,868,832 A | 9/1989 | Marrington et al. | |
| 5,319,571 A | 6/1994 | Langer et al. | |
| 5,381,554 A | 1/1995 | Langer et al. | |
| 5,923,099 A | 7/1999 | Bilir | |
| 6,079,026 A | 6/2000 | Berglund et al. | |
| 6,304,981 B1 | 10/2001 | Spears et al. | |
| 2004/0070279 A1 | 4/2004 | Liu et al. | |
| 2005/0034003 A1 | 2/2005 | Sato et al. | |
| 2005/0052805 A1 | 3/2005 | Sato et al. | |

OTHER PUBLICATIONS

Patent Abstracts of Japan: Publication No. 2005-092859 published Apr. 7, 2005 Omron Corp "Information Processing Device and Method, Recording Medium and Program" and an electronic translation generated by the Japanese Patent Office.

*Primary Examiner*—Robert L. DeBeradinis
(74) *Attorney, Agent, or Firm*—Reed Smith LLP

(57) ABSTRACT

An uninterruptible power supply and its load device are connected by a network, and the load device to which power is fed by the uninterruptible device properly executes shutdown processing. Communication means 49 of uninterruptible power supplies 2 and 3 communicate with a load device 4 to which they themselves feed power, via a network 5. UPS storage means 47 stores a waiting time until the load device 4 starts shutdown after it is notified of detection of power abnormality of an AC power supply 6. Notification means 48 causes the communication means 49 to provide notification of a remaining time until start of shutdown, in a time period until a time period corresponding to the waiting time (67) stored in the UPS storage means 47 elapses after power abnormality of the AC power source 6 is detected.

12 Claims, 7 Drawing Sheets

UNINTERRUPTIBLE POWER SUPPLY, UNINTERRUPTIBLE POWER SUPPLY SYSTEM AND SHUTDOWN PROCESSING PROGRAM PRODUCT

CROSS-REFERENCE TO RELATED APPLICATION

This application claims priority of Japanese Patent Application Number JP2006/065665, filed on Mar. 10, 2006, the complete disclosure of which is hereby incorporated by reference.

BACKGROUND OF THE INVENTION

1. Field of the Invention

The present invention relates to an uninterruptible power supply, an uninterruptible power supply system and a shutdown processing program product.

2. Description of the Related Art

Japanese Patent Application Laid-open No. 2005-92859 (FIGS. 1 to 3, FIG. 5, the column of Mode for Carrying out the Invention, paragraphs 0054, 0055, 0065 and the like) discloses a redundant system. In this redundant system, a plurality of power supplies are connected to an information processor with communication lines of a serial communication method in compliance with the RS-232C standards, and the USB (Universal Serial Bus) standards. A UPS monitoring part and a UPS communication part of the information v processor monitor the states of a plurality of power supplies and control them.

As in the Patent Document, power feed at the time of a power failure can be made redundant by connecting a plurality of uninterruptible power supplies to the information processor. However, in such a configuration as that of the redundant system of the Patent Document, the information processor monitors and controls the uninterruptible power supplies, and therefore, a plurality of uninterruptible power supplies need to be individually connected to the information processor with exclusive communication lines of a serial communication method.

In contrast to this, it is conceivable to connect an information processor and uninterruptible power supplies by using networks used in, for example, the Internet, a LAN (Local Area Network) and the like. Thereby, the uninterruptible power supplies do not have to be connected to the information processor by individual exclusive lines.

However, an indefinite number of devices are connectable to a network. The network cannot be occupied by the respective uninterruptible power supplies. Therefore, when the uninterruptible power supplies send power failure detection notification or the like to the load device, to the network, the notification is not always provided to the load device in the timing when the uninterruptible power supplies detect the power failure. When the other devices use the network, the power failure detection notification to the load device is provided to the load device late, for example.

If the power failure detection notification or the like is provided late like this, power feed to the load device from the uninterruptible power supplies is likely to stop before completion of a predetermined shutdown sequence even if the load device starts the predetermined shutdown sequence based on the notification. The load device sometimes cannot finish shutdown processing normally.

Especially when a plurality of uninterruptible power supplies are connected to one network, if a power failure occurs, a plurality of the uninterruptible power supplies are to transmit power failure detection notification to the network substantially at the same time. Accordingly, the possibility of the power failure detection notification of any of them is provided to the load device late is not low.

Further, in the network, network devices such as a hub device and a router device are used. The network devices operate by power feed. When a power failure occurs and an uninterruptible power supply performs a backup power feed operation, power feed to the network devices is likely to stop. When power feed to the network devices stops, communication through the network cannot be performed. When the network devices stop, a start instruction of shutdown or the like which is to be transmitted to the load device by the uninterruptible power supply is not transmitted to the load device. The load device which starts shutdown based on the start instruction of shutdown cannot start shutdown processing.

The present invention has an object to obtain an uninterruptible power supply, an uninterruptible power system and a shutdown processing program product with which the uninterruptible power supply and its load device are connected by a network, and the load device which is supplied with power by the uninterruptible power device can properly execute shutdown processing.

SUMMARY OF THE INVENTION

An uninterruptible power supply according to the present invention is an uninterruptible power supply connected to between an AC power supply and a load device(s), and has a communication means that communicates with the load device to which the uninterruptible power supply itself feeds power, via a network, a UPS storage means that stores a waiting time until the load device starts shutdown after it is notified of detection of power abnormality of the AC power supply, and a notification means that causes the communication means to provide notification of a remaining time until start of shutdown, in a time period until a time period corresponding to the waiting time stored in the UPS storage means elapses after the power abnormality of the AC power supply is detected.

By adopting the above configuration, the uninterruptible power supply is connected to the load device to which it itself feeds power, by the network, and notifies the load device of the remaining time until start of shutdown. The uninterruptible power supply favorably uses the waiting time of the load device and notifies the load device of the remaining time. Accordingly, even if notification of power abnormality detection or the like to the load device from the uninterruptible power supply is delayed, the load device can start shutdown processing in proper timing based on the remaining time of which it is notified by the uninterruptible power supply. The load device can properly execute shutdown processing.

In addition to the above described configuration of the invention, in the uninterruptible power supply according to the present invention, the notification means repeatedly causes the communication means to provide notification of the remaining time until start of shutdown, in the time period until the time period corresponding to the waiting time stored in the UPS storage means elapses after the power abnormality of the AC power supply is detected.

By adopting the above configuration, the load device is notified of the remaining time a plurality of times. Accordingly, even if the load device is not notified of the remaining time on some of the occasions, the load device can start shutdown processing in proper timing.

In addition to each of the above described configurations of the invention, in the uninterruptible power supply according to the present invention, the communication means provides notification of the remaining time until start of shutdown by a packet which does not need retransmission control or a packet with limitation on a number of retransmissions or retransmission time.

By adopting the above configuration, the load device to which power is fed by the uninterruptible power supply receives notification of the remaining time from the uninterruptible power supply when the notification means of the uninterruptible power supply is to provide notification of the remaining time. The load device can start shutdown processing in timing substantially synchronized with the time which is determined as starting time of shutdown by the uninterruptible power supply. The load device can properly terminate shutdown processing before the uninterruptible power supply stops power feed.

In addition to each of the above described configurations of the invention, in the uninterruptible power supply according to the present invention, when the AC power supply is restored before the time period corresponding to the waiting time stored in the UPS storage means elapses, the notification means causes the communication means to provide notification of a shutdown suspension instruction.

By adopting the above configuration, the load device can be continuously operated without being shut down when the power supply is restored from a power failure in a short time within the waiting time.

In addition to each of the above described configurations of the invention, in the uninterruptible power supply according to the present invention, the UPS storage means stores shutdown time until the load device(s) terminates shutdown after it starts shutdown, and when the AC power supply is restored after the time period corresponding to the waiting time stored in the UPS storage means elapses after the power abnormality of the AC power supply is detected, the notification means causes the communication means to provide notification of an activation instruction to the load device(s), after the shutdown time elapses.

By adopting the above configuration, the load device is immediately reactivated with the minimum stopping time after the power supply is restored from the power failure, and the load device can be operated continuously with the minimum shutdown time period. The load device can be continuously operated.

An uninterruptible power supply system according to the present invention has the uninterruptible power supply according to each of the above described configurations of the invention, a network to which the communication means of the uninterruptible power supply is connected, and a shutdown processing means that is provided in a load device(s) to which power is fed by the uninterruptible power supply and which is connected to the network, and starts shutdown processing when remaining time elapses, when it is notified of the remaining time until start of shutdown by the uninterruptible power supply.

By adopting the above configuration, even if notification of power abnormality detection or the like to the load device from the uninterruptible power supply is delayed, the shutdown processing means can start shutdown processing of the load device in proper timing based on the remaining time of which it is notified. The load device can properly execute shutdown processing.

An uninterruptible power supply system according to the present invention has a plurality of the uninterruptible power supplies according to each of the above described configurations of the invention, a network to which a plurality of the communication means of a plurality of uninterruptible power supplies are connected, a load storage means that is provided in a load device(s) to which power is fed by a plurality of the uninterruptible power supplies and which is connected to the network, and stores one shutdown mode of a power feed priority mode which starts shutdown when all of a plurality of the uninterruptible power supplies detect power abnormality of AC power supplies, and a shutdown priority mode which starts shutdown when one of a plurality of the uninterruptible power supplies detects power abnormality of an AC power supply, a determination means that is provided in the load device(s), judges whether or not the shutdown mode stored by the load storage means is to be established when it is notified of remaining times until start of the shutdown by a plurality of the uninterruptible power supplies, and determines starting time of shutdown processing when the shutdown mode is to be established, and a shutdown processing means that is provided in the load device(s), and starts shutdown processing at the starting time determined by the determining means.

By adopting the above configuration, even if notifications of power abnormality detection or the like from a plurality of uninterruptible power supplies are delayed, the shutdown processing means can start shutdown processing of the load device in timing at which the shutdown mode stored by the load storage means is established based on the remaining time of which it is notified. Even if a plurality of uninterruptible power supplies are connected to the load device, the load device can properly execute shutdown processing based on the shutdown mode stored by the load storage means.

In addition to each of the above described configurations of the invention, in the uninterruptible power supply system according to the present invention, the network uses the Internet protocol.

By adopting the above configuration, the uninterruptible power supply can provide notification of the remaining time until start of shutdown through the network using the Internet protocol.

In addition to each of the above described configurations of the present invention, in the uninterruptible power supply system according to the present invention, the network has a network device(s) which is operated by power feed, and transmits a remaining time until the shutdown is started.

By adopting the above configuration, even if the network device stops when the load device starts shutdown, the shutdown processing means can start shutdown processing of the load device in proper timing based on the remaining time of which it is notified by the uninterruptible power supply before then.

A computer readable program product for shutdown processing according to the present invention causes a computer to which power is fed by an uninterruptible power supply and which is connected to a network that is notified of a remaining time until start of shutdown by the uninterruptible power supply to realize a determining means that determines starting time of shutdown processing based on the remaining time of which it is notified, and a shutdown processing means that starts shutdown processing at the starting time determined by the determining means.

In the computer as the load device of the uninterruptible power supply which executes the program, the shutdown processing means starts shutdown processing of the load device in proper timing based on the remaining time of which it is notified by the uninterruptible power supply, even if notification of power abnormality detection or the like to the load device from the uninterruptible power supply is delayed. The load device can properly execute the shutdown processing.

In the present invention, the uninterruptible power supply and the load device are connected by the network, and the load device to which power is fed from the uninterruptible power supply can properly execute shutdown processing.

DETAILED DESCRIPTION OF THE PREFERRED EMBODIMENT(S)

An uninterruptible power supply, an uninterruptible power supply system and a shutdown processing program product according to an embodiment of the present invention will now be described based on the drawings. The uninterruptible power supply system will be described with a computer system having a server device as a load device as an example. The shutdown processing program product will be described as the one executed in the server device.

Figure 1:
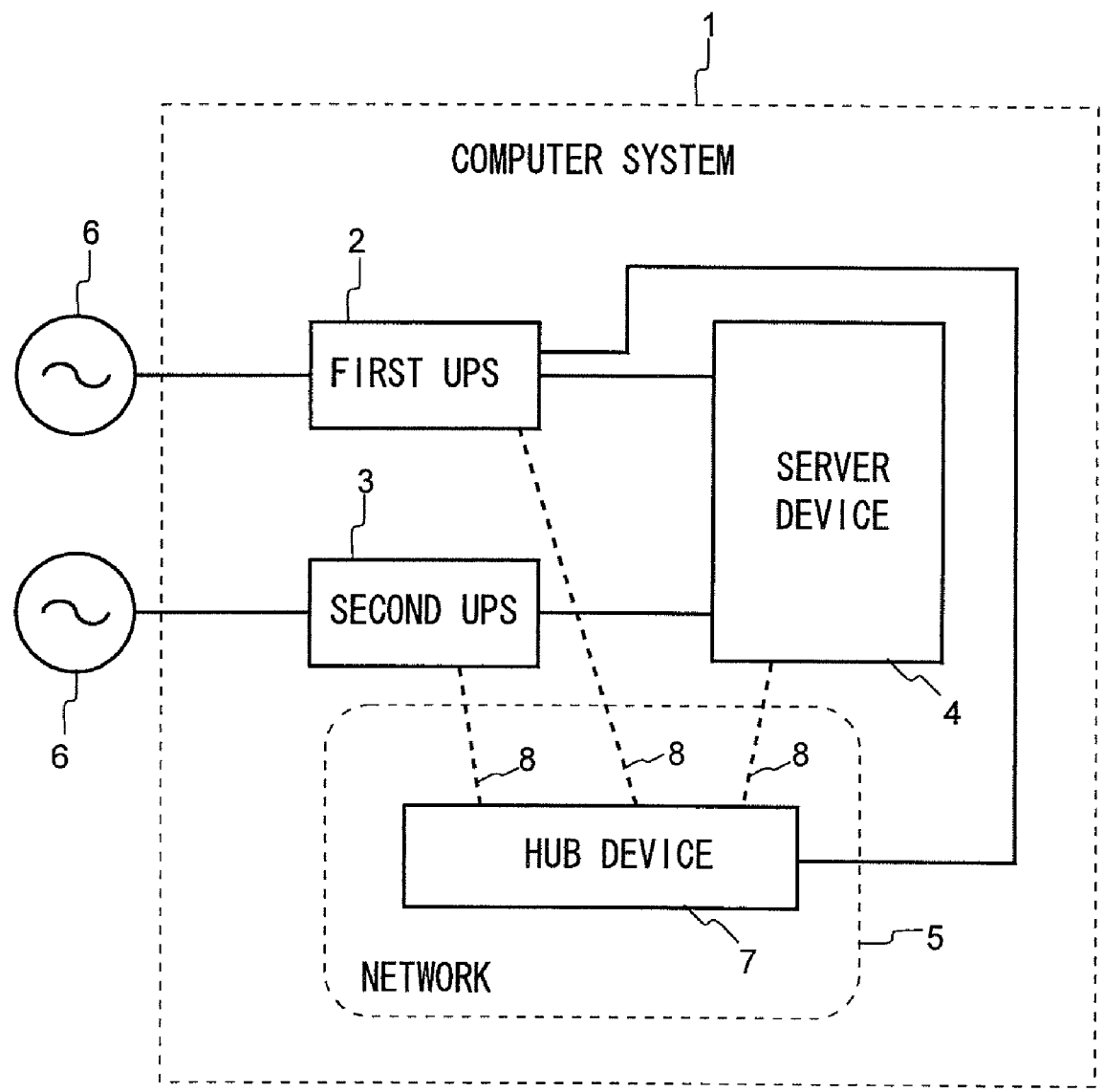
FIG. 1 is a system configuration diagram showing a computer system according to an embodiment of the present invention.

FIG. 1 is a system configuration diagram showing a computer system 1 having the uninterruptible power supply system according to the embodiment of the present invention. The computer system 1 has a first uninterruptible power supply (hereinafter described as the first UPS: uninterruptible power supply) 2 as an uninterruptible power supply, a second uninterruptible power supply (hereinafter described as the second UPS) 3 as an uninterruptible power supply, a server device 4 as a load device, and a network 5. The first UPS 2 and the second UPS 3 are connected separate AC power supplies 6. As the AC power supply 6, for example, a commercial power supply or the like is cited. The first UPS 2 feeds power to the server device 4 and a hub device 7 which will be described later. The second UPS 3 feeds power to the server device 4. The first UPS 2 and the second UPS 3 may be connected to one AC power supply 6.

The network 5 has the hub device 7 and a plurality of network cables 8. As the network cable 8, 100BASE-T or the like is cited. A plurality of network cables 8 are connected to between the hub device 7 and the server device 4, between the hub device 7 and the first UPS 2, and between the hub device 7 and the second UPS 3. When communication data is inputted into the hub device 7 from one of the network cables 8, the hub device 7 transfers the communication data to the remaining plurality of network cables 8. In the network 5, three or more devices can transfer and receive data to and from one another.

Figure 2:
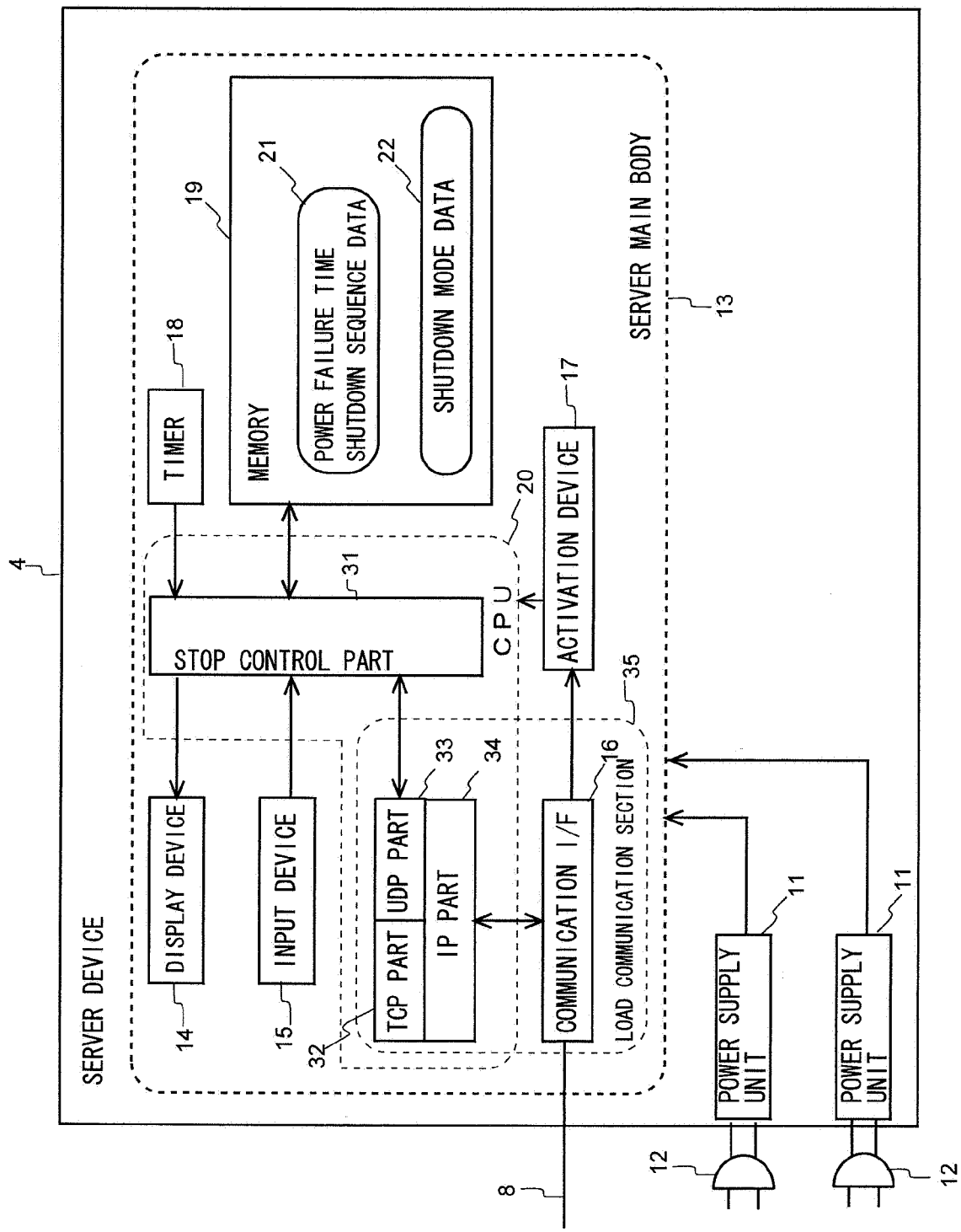
FIG. 2 is a block diagram showing the configuration of a server device in FIG. 1.

FIG. 2 is a block diagram showing the configuration of the server device 4 in FIG. 1.

The server device 4 has two power supply units 11. Power supply cables 12 are connected to the power supply units 11. The plugs of the two power supply cables 12 are respectively connected to a receptacle 51 which will be described later of the first UPS 2, and a receptacle 51 which will be described later of the second UPS 3. The two power supply units 11 convert AC power supplied from the respective power supply cables 12 into DC power, and supplies it to a server main body 13 of the server device 4. Thereby, power which is supplied to the server main body 13 is made redundant.

The server main body 13 of the sever device 4 has a display device 14, an input device 15, a communication I/F (Interface) 16, an activation device 17, a timer 18, a memory 19 as a load storage means, and a CPU (Central Processing Unit) 20 not shown. The display device 14, the input device 15, the communication I/F 16, the timer 18 and the memory 19 are connected to the CPU 20.

The display device 14 has a display part not shown. The display device 14 displays an image based on the display data on the display part.

The input device 15 has an operation part such as, for example, a key board, and a pointing device. The input device 15 generates input data corresponding to the operation in the operation part by a user.

The network cable 8 is connected to the communication I/F 16. The communication I/F 16 has a MAC (Media Access Control) address. The MAC address is the number peculiar to each communication I/F 16.

The activation device 17 activates the CPU 20.

The timer 18 counts time. The timer 18 generates, for example, time information.

The memory 19 stores power failure time shutdown sequence data 21, shutdown mode data 22 and the like. The memory 19 is constituted of, for example, a hard disk drive and the like.

Figure 3:
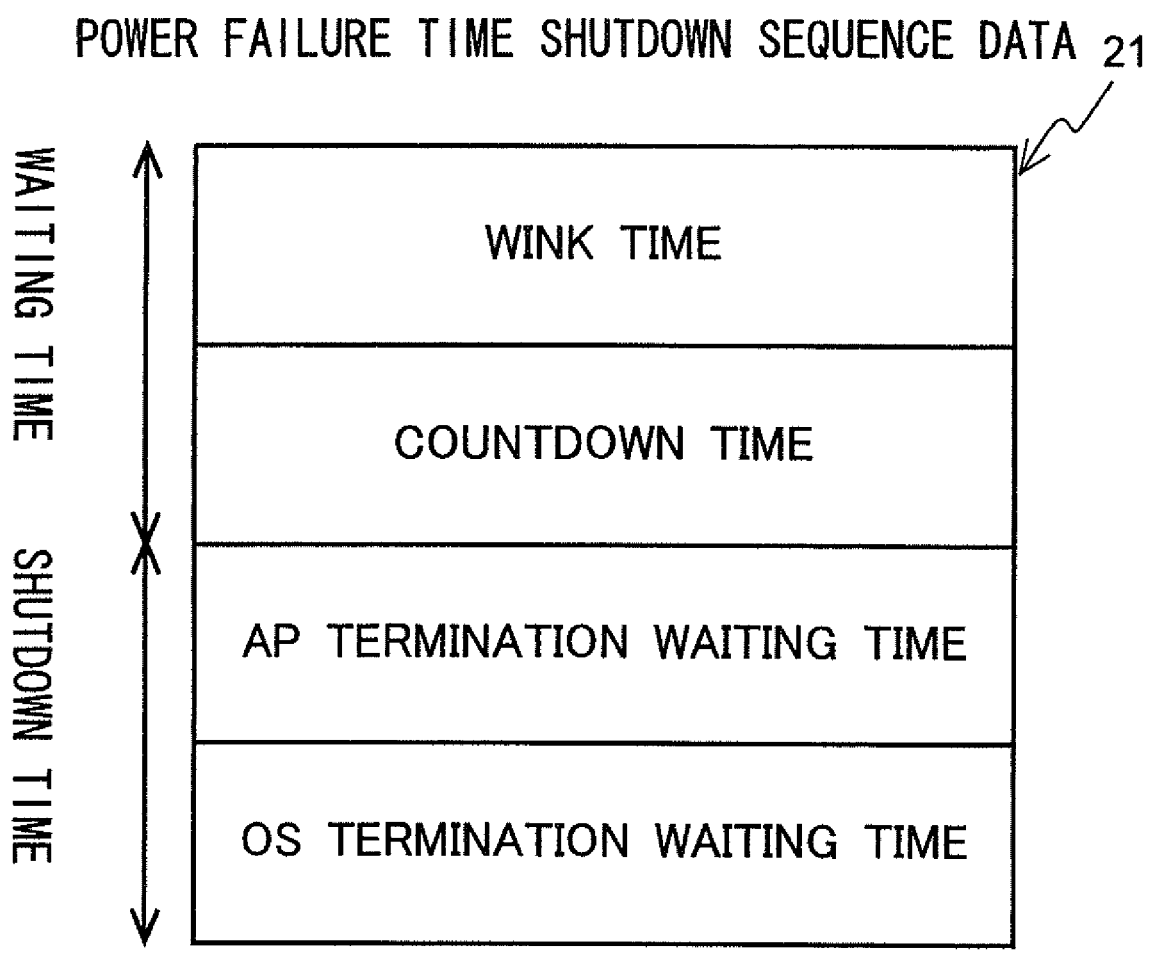
FIG. 3 is an explanatory diagram showing a data structure of power failure time shutdown sequence data stored in a memory in FIG. 2.

FIG. 3 is an explanatory diagram showing a data structure of the power failure time shutdown sequence data 21 which is stored in the memory 19 in FIG. 2. The power failure time shutdown sequence data 21 is constituted of a wink time, a countdown time, an AP (Application Program) termination waiting time, and an OS (Operating System Program) termination waiting time.

The wink time of the power failure time shutdown sequence data 21 is the time until countdown is started after notification of power failure detection is provided. The countdown time is the time for executing countdown before the start of shutdown. The AP termination waiting time is the time for waiting for completion of termination processing of the application program. The OS termination waiting time is the time for waiting for completion of termination processing of the operating system program. The total time of the wink time and the countdown time is the waiting time until shutdown is started, and is, for example, five minutes. The AP termination waiting time and the OS termination waiting time are shutdown time for executing shutdown processing. The power failure time shutdown sequence data 21 has the value of the wink time, the value of the countdown time, the value of the AP termination waiting time and the value of the OS termination waiting time.

The shutdown mode data 22 is data which specifies the start conditions of the shutdown processing of the server device 4. The shutdown mode includes a shutdown priority mode, a power feed priority mode and the like. The shutdown priority mode is the mode which stops the server device 4 when one of the first UPS 2 and the second UPS 3 which feed power to the server device 4 detects a power failure. The power feed priority mode is the mode which stops the server device 4 when all the first UPS 2 and the second UPS 3 which feed power to the server device 4 detect power failures. The memory 19 stores the value corresponding to the shutdown priority mode or the value corresponding to the power feed priority mode as the shutdown mode data 22. The memory 19 may be the one that stores the value of a third mode which stops the server device 4 as the shutdown mode data 22 when two or more of uninterruptible power supplies of, for example, three or more of uninterruptible power supplies detect power failures.

The CPU 20 of the server main body 13 executes an operating system program and an application program not shown. The application program includes, for example, a stop control program. As a result that the CPU 20 executes the stop control program, a stop control part 31 as a determining means and a shutdown processing means is realized in the server device 4. Further, as a result that the CPU 20 executes the operating system program, a TCP (Transmission Control Protocol) part, a UDP (User Datagram Protocol) part, an IP (Internet Protocol) part are realized in the server device 4. The TCP part 32, the UDP part 33 and the IP part 34 constitute a load communication section 35 with the communication I/F 16.

It is suitable that the operating system program and the application program such as the stop control program are stored in the memory 19 or the like in FIG. 2, for example. These programs stored in the memory 19 may be supplied to a user with the server device 4, or may be provided to the user separately from the server device 4. When the programs are provided to the user separately from the server device 4, the programs may be provided in the state in which it is stored in a computer-readable recording medium such as, for example, a CD-ROM, or may be provided through a transmission medium such as the Internet.

The IP part 34 has an IP address. The IP address is the value corresponding to the scale of the network 5 such as class A, class B and class C. The IP address has the peculiar value in the network 5. The IP part 34 adds the IP address of the transmitter (itself) and the IP address of the transmission destination to the data to be transmitted and supplies the data to the communication I/F 16.

The TCP part 32 adds the number in accordance with, for example, the transmission sequence, to the data to be transmitted and supplies the data to the IP part 34. When the TCP part 32 is supplied with the received data from the IP part 34, the TCP part 32 confirms the number added to the data. When the TCP part 32 determines that missing (omission) of a number or the like occurs by comparison with a plurality of numbers confirmed in the past, for example, the TCP part 32 generates retransmission request of the data to which the missing (omitted) number is added, and supplies it to the IP part 34. The TCP part 32 acquires data in the sequence of transmission of the other TCP parts 32 without causing data omission by the retransmission control.

The UDP part 33 adds the number in accordance with, for example, transmission sequence to the data to be transmitted, and supplies the data to the IP part 34. The UDP part 33 acquires the received data from the IP part 34. Unlike the TCP part 32, the UDP part 33 does not request retransmission of data even if omission of the data occurs. The UDP part 33 does not receive omitted data.

The stop control part 31 terminates execution of a program by the CPU 20 of the server device 4 by predetermined shutdown sequence processing.

Figure 4:
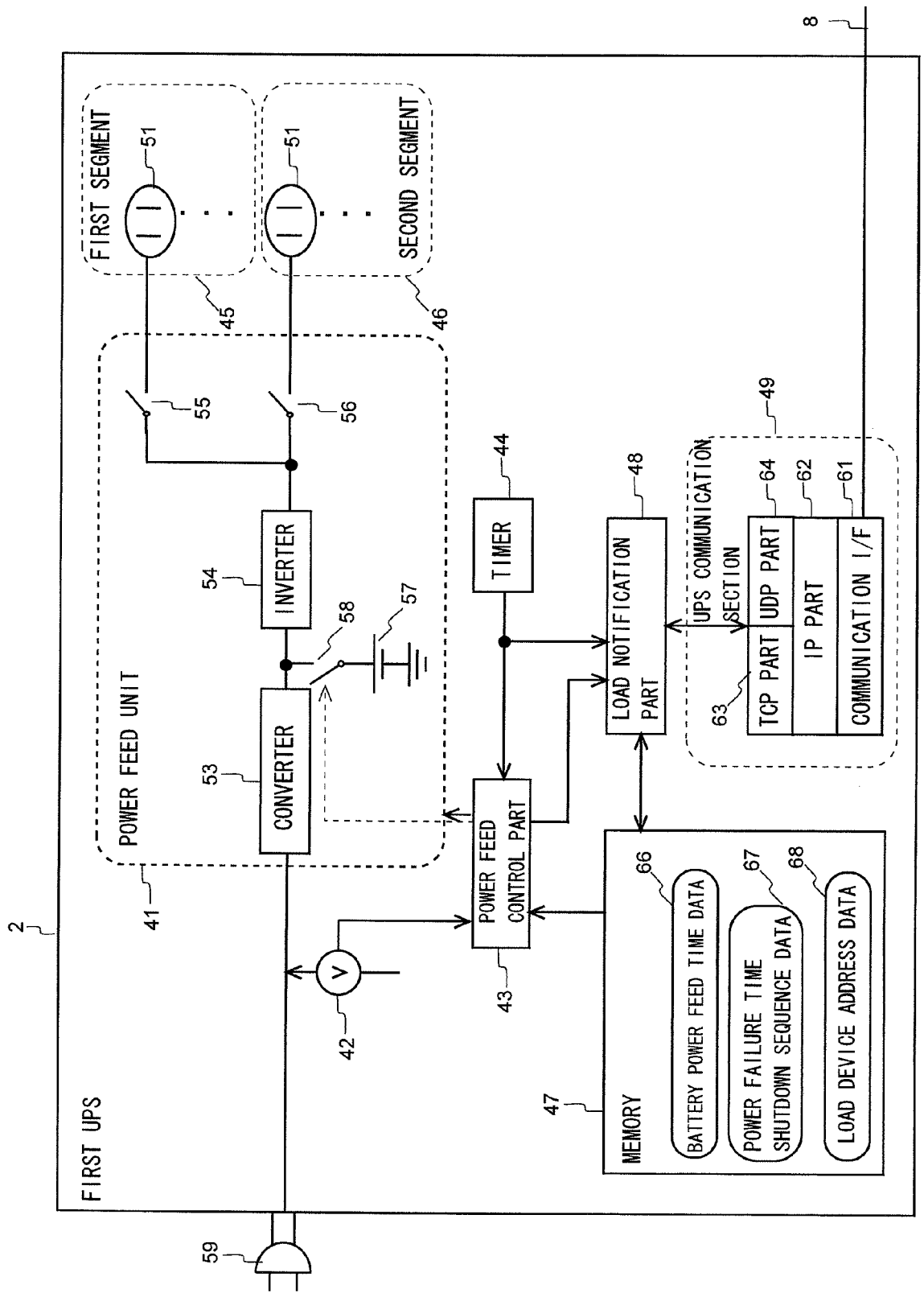
FIG. 4 is a block diagram showing the configuration of a first UPS in FIG. 1.

FIG. 4 is a block diagram showing the configuration of the first UPS 2 in FIG. 1.

The first UPS 2 has a power feed unit 41, an input voltage detector 42, a power feed control part 43, a timer 44 which counts time, a first segment 45, a second segment 46, a memory 47 as a UPS storage means, a load notification part 48 as a notification means and a UPS communication section 49 as a communication means. The load notification part 48, the UPS communication section 49 and the like may be formed as option cards attachable to and detachable from the casing of the first UPS 2.

The first segment 45 has a plurality of receptacles 51. The second segment 46 has a plurality of receptacles 51. As shown in FIG. 1, the server device 4 and the hub device 7 are connected to the first UPS 2. The plug of one of the power supply cables 12 of the server device 4 is connected to the receptacle 51 of the first segment 45, for example, and the plug of the power supply cable of the hub device 7 is connected to the receptacle 51 of the second segment 46.

The power feed unit 41 has, for example, a converter 53, an inverter 54, a first power feed switch 55, a second power feed switch 56, a battery 57 and a switch 58. A power supply cable 59 is connected to the converter 53. The power supply cable 59 is connected to the AC power supply 6 in FIG. 1. When the converter 53 is supplied with AC power from the power supply cable 59, the converter 53 generates predetermined DC power.

The inverter 54 and the switch 58 are connected to the output of the converter 53. The battery 57 is further connected to the switch 58. The inverter 54 converts DC power into AC power. The voltage of the AC power generated by the inverter changes with substantially the same amplitude and at substantially the same frequency as the voltage of the AC power supply 6. The AC power converted by the inverter 54 is supplied to the first segment 45 via the first power feed switch 55. The AC power converted by the inverter 54 is supplied to the second segment 46 via the second power feed switch 56.

The power feed unit 41 has one inverter, and two switches are connected to the output of the one inverter, and the two switches may be configured to be separately connected to the first segment 45 and the second segment 46.

The input voltage detector 42 monitors voltage of AC power which is supplied to the converter 53 of the power feed unit 41. The input voltage detector 42 notifies the power feed control part 43 of power failure detection when the voltage of the AC power which is supplied to, for example, the converter 53 remains to be predetermined voltage or less.

The power feed control part 43 controls the power feed unit 41. The power feed control part 43 controls activation and stop of the converter 53 and the inverter 54. The power feed control part 43 turns on and off the first power feed switch 55, the second power feed switch 56, and the switch 58 connected to the battery 57.

The UPS communication section 49 has a communication I/F 61 to which the network cable 8 is connected, an IP part 62, a TCP part 63 and a UDP part 64.

The memory 47 stores battery power feed time data 66, power failure time shutdown sequence data 67, and load device address data 68.

Battery power feed time is the time in which the first UPS 2 performs battery power feed for the load device at the time of a power failure. The battery power feed time data 66 has the value of this power feed time. A plurality of the battery power feed time data 66 may be stored for each segment, for example.

The power failure time shutdown sequence data 67 has the same data structure and value as the power failure time shutdown sequence data 21 in FIG. 3 stored by the server device 4 as the load device. The total time of the wink time, the countdown time, the AP termination waiting time and the OS termination waiting time of the power failure time shutdown sequence data 67 is set to be the battery power feed time or less. The power failure time shutdown sequence data 67 may be stored in the memory 47 in advance, or may be stored in the memory 47 based on notification by the server device 4.

The load device address data 68 is the value of the address of the server device 4. The server device 4 is the load device which the first UPS 2 notifies of a power failure when the first UPS 2 detects the power failure. The load device address is, for example, the IP address of the server device 4. The load device address data 68 is stored in the memory 47 based on the notification by the server device 4, for example. The server device 4 notifies the first UPS 2 of the power failure time shutdown sequence data 21 and the load device address based on the operation of the input device 15, for example.

The load notification part 48 generates various kinds of instructions and notifications. The instructions generated by the load notification part 48 include, for example, a shutdown instruction, a shutdown suspension instruction, an activation instruction and the like. The notifications generated by the load notification part 48 include, for example, a power failure detection notification, a notification of the remaining time until the shutdown instruction, and the like. The load notification part 48 supplies the instructions and notifications which it generates to the UPS communication section 49.

The second UPS 3 in FIG. 1 has the power feed unit 41 to which the AC power supply 6 is connected, the input voltage detector 42, the power feed control part 43, the timer 44, the first segment 45, the second segment 46, the memory 47, the load notification part 48, and the UPS communication section 49. The UPS communication section 49 has the communication I/F 61 to which the network cable 8 is connected, the IP part 62, the TCP part 63 and the UDP part 64. The memory 47 stores the battery power feed time data 66, the power failure time shutdown sequence data 67, and the load device address data 68. Each of the components of the above second UPS 3 has the same function of the component of the same name in the first UPS 2 shown in FIG. 4. Therefore, each of them is assigned with the same reference numeral and character, and illustration and description of it will be omitted.

The plug of the remaining one power supply cable 12 of the server device 4 is connected to receptacle 51 of the first segment 45 of, for example, the second UPS 3.

Next, an operation of the computer system 1 according to the embodiment of the present invention will be described.

In the following explanation, explanation will be made from the state in which the two AC power supplies 6 normally operate, the first UPS 2 feeds power to the server device 4 and the hub device 7, and the second UPS 3 feeds power to the server device 4. When the AC power supply 6 is normal, the converters 53 of the power feed units 41 of the first UPS 2 and the second UPS 3 convert AC power fed from the AC power supplies 6 into DC power, and the inverters 54 convert the DC power generated by the converters 53 into AC power. The AC power generated by the inverters 54 is fed to the server device 4 and the hub device 7.

Figure 5:
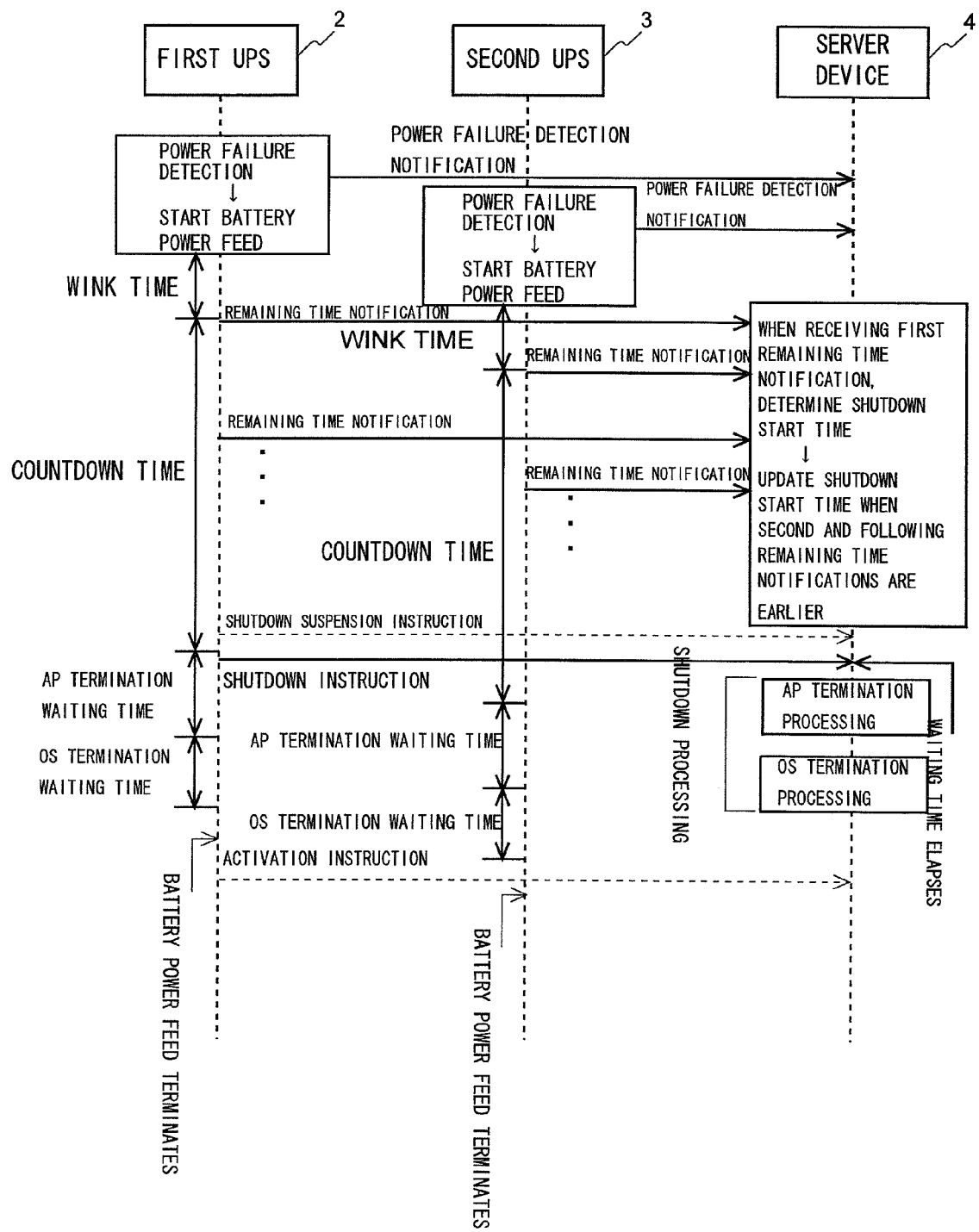
FIG. 5 is a flowchart showing the flow of the operation in a shutdown priority mode.

FIG. 5 is a flow chart showing the flow of the operation when the shutdown mode data 22 stored by the server device 4 is a value corresponding to the shutdown priority mode.

The input voltage detector 42 of the first UPS 2 monitors the voltage of the AC power supplied to the converter 53 of the power feed unit 41 from the AC power supply 6. When a power failure occurs, and the voltage of the AC power supplied to the converter 53 remains to be predetermined voltage or less, the input voltage detector 42 notifies the power feed control part 43 of power failure detection.

When the power feed control part 43 is notified of the power failure detection by the input voltage detector 42, the power feed control part 43 controls the switch 58 connected to the battery 57 of the power feed unit 41 to the closed state from the open state. Thereby, the battery 57 is connected to the inverter 54. The inverter 54 converts the DC power charged in the battery 57 into AC power.

The AC power generated by the inverter 54 is supplied to the power supply unit 11 of the server device 4 via the first power feed switch 55, the receptacle 51 of the first segment 45, and the power supply cable 12. Thereby, the power supply unit 11 of the server device 4 can continue to supply power to the server main body 13 by the power supplied from the battery 57 of the first UPS 2 though the AC power supply 6 is in the power failure state.

Further, the AC power generated by the inverter 54 is supplied to the hub device 7 via the second power feed switch 56, the receptacle 51 of the second segment 46 and the power supply cable. The hub device 7 continues to be operated by the power which is supplied from the battery 57 of the first UPS 2 though the AC power supply 6 is in the power failure state.

When the power feed control part 43 of the first UPS 2 is notified of power failure detection by the input power detector 42, it further notifies the load notification part 48 of the power failure detection. The load notification part 48 may be directly supplied with the power failure detection from the input power detector 42.

When the load notification part 48 of the first UPS 2 is notified of the power failure detection, it generates transmission data of notification of the power failure detection. The load notification part 48 supplies the generated transmission data of notification of the power failure detection to the TCP part 63 of the UPS communication section 49.

The TCP part 63 of the first UPS 2 adds the number in accordance with transmission sequence to the transmission date of notification of the power detection, and supplies it to the IP part 62. The IP part 62 of the first UPS 2 adds its own IP address and the IP address in accordance with the load device address data stored in the memory 47 to the data supplied from the TCP part 63 to supply it to the communication I/F 61. The communication I/F 61 of the first UPS 2 sends the data supplied from the IP part 62 to the network cable 8.

The communication data sent to the network cable 8 is received by the hub device 7. The hub device 7 sends the received data to the other network cables 8. Thereby, the data sent to the network cable 8 by the communication I/F 61 of the first UPS 2 is transferred to the network cable 8 connected to the server device 4.

The communication I/F 16 of the server device 4 acquires the communication data from the network cable 8. The communication I/F 16 supplies the received data to the IP part 34. When the IP part 34 of the server device 4 confirms the transmission destination address of the received data supplied from the communication I/F 16 is its own address, it supplies the received data to the TCP part 32 of the server device 4.

The data which is supplied to the TCP part 32 by the IP part 34 of the server device 4 includes the number added by the TCP part 63 of the first UPS 2 as well as the transmission data of notification of the power failure detection. When the TCP part 32 of the server device 4 is supplied with the data from the IP part 34, it confirms the number added to the data. After the TCP part 32 confirms that there is no occurrence of missing (omission) of a number or the like, the TCP part 32 of the server device 4 supplies the confirmed data to the stop control part 31.

When missing (omission) of a number or the like occurs due to data loss or the like in the network 5, the TCP part 32 of the server device 4 generates a retransmission request of the data to which the missing (omitted) number is added, and supplies it to the IP part 34. The retransmission request is transmitted to the TCP part 63 of the first UPS 2 via the IP part 34 of the server device 4, the communication I/F 16 of the server device 4, the network 5, the communication I/F 61 of the first UPS 2, and the IP part 62 of the first UPS 2. The TCP part 63 of the first UPS 2 executes processing of retransmitting the data assigned with the number of which retransmission is requested.

When all of the data which is intended to be transmitted by the TCP part 63 of the first UPS 2 is received by the TCP part 32 of the server device 4, the TCP part 32 of the server device 4 notifies the stop control part 31 of the power failure detection. The stop control part 31 of the server device 4 comes to know that the first UPS 2 detects the power failure.

As described above, when the load notification part 48 of the first UPS 2 is notified of power failure detection from the power feed control part 48, it notifies the stop control part 31 of the server device 4 of the power failure detection. The load notification part 48 of the first UPS 2 acquires the wink time of the power failure time shutdown sequence data 67 from the memory 47, and repeatedly acquires the time information from the timer 18.

When the elapsed time after notification of the power failure detection is the wink time or longer, the load notification part 48 of the first UPS 2 generates a notification of the remaining time until a shutdown instruction. The remaining time is the remaining time until the shutdown instruction at the point of time when, for example, the load notification part 48 determines the elapsed time after notification of the power failure detection. The load notification part 48 generates transmission data of the generated notification of the remaining time until the shutdown instruction, and supplies it to the UDP part 64 of the UPS communication section 49.

When the UDP part 64 of the first UPS 2 is supplied with the transmission data of the notification of the remaining time until the shutdown instruction, it adds the number in accordance with the transmission sequence to the data, and supplies it to the IP part 62. The IP part 62 of the first UPS 2 transmits the data supplied from the UDP part 64 to the IP part 34 of the server device 4 via the communication I/F 61 of the first UPS 2, the network 5 and the communication I/F 16 of the server device 4. The IP part 34 of the server device 4 supplies the data received from the IP part 62 of the first UPS 2 to the UDP part 33 of the server device 4. The UDP part 33 of the server device 4 supplies the supplied data to the stop control part 31. Thereby, the stop control part 31 receives the transmission data of notification of the remaining time until the shutdown instruction generated by the load notification part 48 of the first UPS 2 when data loss or the like in the network 5 does not occur.

When the stop control part 31 of the server device 4 is notified of the remaining time until the shutdown instruction, it first reads the shutdown mode data 22 from the memory 19. In the flowchart in FIG. 5, the shutdown mode data 22 has the value of the shutdown priority mode. The stop control part 31 judges that it is the shutdown priority mode based on the read data. The stop control part 31 determines the time obtained by adding the remaining time of notification to the time at which it receives the first remaining time notification as the starting time of shutdown processing. The stop control part 31 stores the calculated starting time of the shutdown processing in the memory 19.

After determining the starting time of the shutdown processing, the stop control part 31 of the server device 4 repeatedly acquires the time information of the timer 18. When it is the determined starting time, after the stop control part 31 is notified of the remaining time until the shutdown instruction, the stop control part 31 itself starts the shutdown processing. The stop control part 31 may set the starting time of the shutdown processing in the timer 18, the timer 18 notifies the stop control part 31 of start of the shutdown processing when it is the starting time, and the stop control part 31 itself may start the shutdown processing based on its notification.

In the shutdown processing, the stop control part 31 of the server 4 first executes termination processing of the other application programs executed in the server device 4. As the other application programs, for example, a server program, a mail program, a filter program and the like are cited. The stop control part 31 issues a termination command of each of the application programs to, for example, the CPU 20. The CPU 20 terminates the application programs based on the termination commands. The data and the like used by the application programs are stored in the memory 19.

After starting the termination processing of the other application programs, the stop control part 31 acquires the AP termination waiting time of the power failure time shutdown sequence data 21 from the memory 19, and repeatedly acquires the time information from the timer 18. When the elapsed time after the start of the termination processing of the other application programs is the AP termination waiting time or longer, the stop control part 31 starts the shutdown processing of the operating system program and the stop control program. The stop control part 31 may set the AP termination waiting time in the timer 18, and when the waiting time elapses, the timer 18 may notify the stop control part 31 that the waiting time has elapsed. Based on the notification, the stop control part 31 may start the shutdown processing of the operating system program and the stop control program.

The stop control part 31 issues the termination command of the stop control program and the termination command of the operating system program to, for example, the CPU 20. The CPU 20 terminates execution of the stop control program and execution of the operating system program based on these termination commands. The data used by the stop control program, the data used by the operating system program and the like are stored in the memory 19. When execution of the operating system program by the CPU 20 is terminated, the server device 4 stops its operation.

By the above shutdown processing, the CPU 20 of the server device 4 terminates all the programs which it executes. The CPU 20 of the server device 4 terminates execution of all the programs, while the elapsed time after starting the shutdown processing is shorter than the total time of the AP termination waiting time and the OS termination waiting time of the power failure time shutdown sequence stored in the memory 19.

As described above, the server device 4 executes the shutdown processing based on the notification of the remaining time until start of the shutdown from the first UPS 2. Meanwhile, the power feed control part 43 and the load notification part 48 of the first UPS 2 which detect the power failure execute the following processing.

When detecting the power failure, the power feed control part 43 of the first UPS 2 closes the switch 58 of the power feed unit to start battery power feed as described above. Thereafter, the power feed control part 43 acquires the battery power feed time data 66 from the memory 19, and repeatedly acquires the time information of the timer 18. When the battery power feed time is the battery power feed time stored in the memory 19 or longer, the power feed control part 43 controls the switch 58 connected to the battery 57 of the power feed unit 41 to the open state from the closed state. Thereby, the battery 57 is cut off from the inverter 54. DC power is not supplied to the inverter 54, and it does not output AC power. Power feed to the server device 4 and the hub device 7 from the first UPS 2 is terminated. The server device 4 and the hub device 7 stop.

The total time of the wink time, the countdown time, the AP termination waiting time and the OS termination waiting time of the power failure time shutdown sequence data 21 and 67 is not longer than the battery power feed time. Accordingly, the server device 4 which executes the shutdown processing based on the notification of the remaining time until start of shutdown from the first UPS 2 terminates execution of all the programs before power feed from the first UPS 2 terminates. The server device 4 stops normally.

The load notification part 48 of the first UPS 2 repeatedly provides the notification of the remaining time until start of shutdown in the time period until the countdown time elapses as shown in FIG. 5. Each of the notifications of the remaining time generated by the load notification part 48 is transmitted to the UDP part 33 of the server device 4 from the UDP part 64 of the first UPS 2. The UDP part 33 of the server device 4 supplies the received notification of the remaining time to the stop control part 31.

Accordingly, in the time period until the countdown time in the first UPS 2 elapses, the stop control part 31 of the server device 4 is notified of a plurality of remaining times when the network 5 operates normally and data loss or the like does not occur in the network 5. When the stop control part 31 is notified of the second and the following remaining times from the first UPS 2, it may update the starting time of the shutdown processing with those remaining times, or may ignore the second and the following remaining time notifications from the first UPS 2.

When the stop control part 31 of the server device 4 receives one of a plurality of remaining time notifications from the first UPS 2, it can determine the timing synchronized with the first UPS 2 as the starting time of shutdown. Accordingly, even when the remaining time notification which the load notification part 48 of the first UPS 2 first transmits is not transmitted to the server device 4 due to data collision in the network 5, for example, the second and the following remaining time notifications are transmitted to the server device 4, whereby the stop control part 31 of the server device 4 can determine the timing synchronized with the first UPS 2 as the starting time of shutdown. In addition to this, even when the server device 4 is in the state in which it is incommunicable by the network 5 before the server device 4 starts shutdown because power feed to the hub device 7 of the network 5 terminates earlier than the server device 4, for example, the stop control part 31 of the server device 4 can determine the timing synchronized with the first UPS 2 as the starting time of shutdown in accordance with the remaining time notification which it receive before the communication becomes impossible.

When the countdown time elapses, the load notification part 48 of the first UPS 2 generates a shutdown instruction. The shutdown instruction is transmitted to the stop control part 31 of the server device 4 via the TCP part 63, the IP part 62 and the communication I/F 61 of the first UPS 2, the network 5, the communication I/F 16, the IP part 34 and the TCP part 32 of the server device 4.

When receiving the shutdown instruction, the stop control part 31 of the server device 4 starts the shutdown processing even if it is not the starting time of shutdown which is already determined based on the remaining time notification. Thereby, the server device 4 starts the shutdown processing in the timing synchronized with the first UPS 2, terminates execution of all the programs before power feed from the first UPS 2 terminates, and can stop normally.

The server device 4 already determines the starting time of shutdown based on the remaining time notification. Accordingly, the server device 4 can start the shutdown processing in the timing synchronized with the first UPS 2 even if it does not receive the shutdown instruction.

When the AC power supply 6 is brought into the normal state, the power supply is restored from the power failure, and normal AC power starts to be supplied to the first UPS 2 from the AC power supply 6, the input voltage detector 42 of the first UPS 2 notifies the power feed control part 43 of restoration detection. The power feed control part 43 controls the switch 58 of the power feed unit 41 to the open state from the closed state. Thereby, battery power feed is terminated. When the charged power of the battery 57 decreases, and charge is required, the power feed control part 43 may keep the switch 58 of the power feed unit 41 in the closed state until the charged power of the battery 57 becomes a predetermined power, and thereafter, may control it to the open state.

When the power feed control part 43 of the first UPS 2 is notified of the restoration detection from the input voltage detector 42, it notifies the load notification part 48 of the restoration detection. The load notification part 48 may be directly supplied with the restoration detection from the input voltage detector 42.

When the load notification part 48 of the first UPS 2 is notified of the restoration detection, it starts restoration notification processing corresponding to the notification timing. More specifically, when the load notification part 48 is notified of the restoration detection, it reads the wink time and the countdown time from the memory 19 first. The load notification part 48 further reads the time of the timer 18, and compares the elapsed time after notification of the power failure detection, and the total time of the wink time and the countdown time. The total time of the wink time and the countdown time is the time until the shutdown processing is started after detection of the power failure. After the total time elapses, the stop control part 31 of the server device 4 starts the shutdown processing.

In the case where the total time of the wink time and the countdown time has not elapsed yet, the load notification part 48 of the first UPS 2 generates the transmission data of a shutdown suspension instruction. The transmission data of the shutdown suspension instruction generated by the load notification part 48 is transmitted to the stop control part 31 of the server device 4 via the TCP part 63, the IP part 62 and the communication I/F 61 of the first UPS 2, the network 5, the communication I/F 16, the IP part 34 and the TCP part 32 of the server device 4.

When receiving the shutdown suspension instruction, the stop control part 31 of the server device 4 voids the starting time of the shutdown processing which is already determined, and suspends the shutdown processing. Thereby, the application program and the operating system program which are executed in the server device 4 are continuously executed. The server device 4 can continuously operate though the first UPS 2 detects the power failure.

In the case where the total time of the wink time and the countdown time has already elapsed, the load notification part 48 of the first UPS 2 reads the AP termination waiting time and the OS termination waiting time from the memory 19. The total time of the AP termination waiting time and the OS termination waiting time is the shutdown time. The stop control part 31 of the server device 4 completes execution of the shutdown processing within the shutdown time.

After reading the AP termination waiting time and the OS termination waiting time, the load notification part 48 repeatedly acquires the time information of the timer 18, and compares the acquired time and the shutdown time. When the time equivalent to the shutdown time or longer elapses, the load notification part 48 generates an activation instruction. The activation instruction is transmitted to the communication I/F 16 of the server device 4 via the TCP part 63, the IP part 62 and the communication I/F 61 of the first UPS 2, and the network 5.

When the shutdown time elapses like this, the server device 4 stops normally. In the server device 4, the IP part 34, the TCP part 32 and the stop control part 31 are not realized. The communication I/F 16 of the server device 4 supplies the received data to the activation device 17.

When the activation device 17 is supplied with the received data from the communication I/F 16 of the server device 4, the activation device 17 activates the CPU 20. The activation device 17 may activate the CPU 20 after confirming that the data is the data addressed to the server device 4 based on the MAC address or the like added to the data acquired by the communication I/F 16, for example.

The CPU 20 which is activated by the activation device 17 first reads the operating system program from the memory 19 and executes it. The CPU 20 further reads the application program of the server device 4 including the stop control program and executes it. Thereby, in the server device 4, the stop control part 31, the TCP part 32, the UDP part 33, the IP part 34 and the like shown in FIG. 2 are realized. The server device 4 is restored to the state before the shutdown processing.

In the above description of the operation, the first UPS 2 detects a power failure and restoration of the AC power supply 6, and in accordance with this, it transmits the power failure detection notification, the remaining time notification before start of shutdown, the shutdown instruction directing to start the shutdown processing, the shutdown suspension instruction directing to suspend the shutdown processing, the activation instruction activating the server device and the like to the server device 4.

When the server device 4 receives the notification of the remaining time until start of shutdown from the first UPS 2, it determines the starting time of shutdown based on it, and starts the shutdown processing even if it does not receive the shutdown instruction from the first UPS 2 when it is the starting time. Further, when the server device 4 receives the shutdown suspension instruction from the first UPS 2, it suspends shutdown, and when it receives the activation instruction from the first UPS 2, it is restored by reactivation.

As shown in FIG. 1, the computer system 1 according to this embodiment has the second UPS 3 in addition to the first UPS 2. When a plurality of uninterruptible power supplies exist like this, these plurality of uninterruptible power supplies detect power failures and restoration of the AC power supplies 6 at substantially the same time.

In the flowchart of FIG. 5, the second UPS 3 detects a power failure a little later than the first UPS 2. When detecting the power failure, the second UPS 3 transmits a power failure detection notification, a notification of the remaining time until start of shutdown, a shutdown instruction, a shutdown suspension instruction and the like to the server device 4.

When receiving the power detection notifications, the notifications of the remaining time until start of shutdown, the shutdown instructions, the shutdown suspension instructions and the like from a plurality of uninterruptible power supplies like this, the stop control part 31 of the server device 4, which operates in the shutdown priority mode, operates as follows.

When the stop control part 31 of the server device 4 first receives the notification of the remaining time until start of shutdown, it confirms the shutdown mode first, and determines the starting time of shutdown. The stop control part 31 determines the time which is obtained by adding the remaining time of which it is notified to the time of its reception as the starting time of shutdown.

When receiving the second and the following remaining time notifications, the stop control part 31 adds the received remaining time of each of the notifications to its reception time. When the calculated time is earlier than the starting time of shutdown which is already determined, the stop control part 31 updates the starting time of shutdown to the newly calculated time. When the calculated time is later than the starting time of shutdown already determined, the stop control part 31 does not update the starting time of shutdown. The stop control part 31 repeatedly executes the above confirmation and update processing every time it receives the second and the following remaining time notifications.

By such a control, the stop control part 31 can determine the timing synchronized with the uninterruptible power supply which detects a power failure earlier as the starting time of shutdown irrespective of the sequence of reception of the remaining time notification from the first UPS 2 and the remaining time notification from the second UPS 3. Therefore, even when communication with the first UPS 2 and the second UPS 3 is disconnected, the stop control part 31 can execute the shutdown processing for itself under the shutdown priority condition.

Concerning the shutdown instruction, the stop control part 31 of the server device 4 starts the shutdown processing when receiving the first one of both the remaining time notifications of the first UPS 2 and the second UPS 3. The stop control part 31 ignores the second shutdown instruction. Thereby, the stop control part 31 can execute the shutdown processing under the shutdown priority condition.

Concerning the shutdown suspension instruction, the stop control part 31 suspends the shutdown processing when receiving the shutdown suspension instructions from both of the first UPS 2 and the second UPS 3. Thereby, the stop control part 31 can execute the shutdown processing under the shutdown priority condition.

Figure 6:
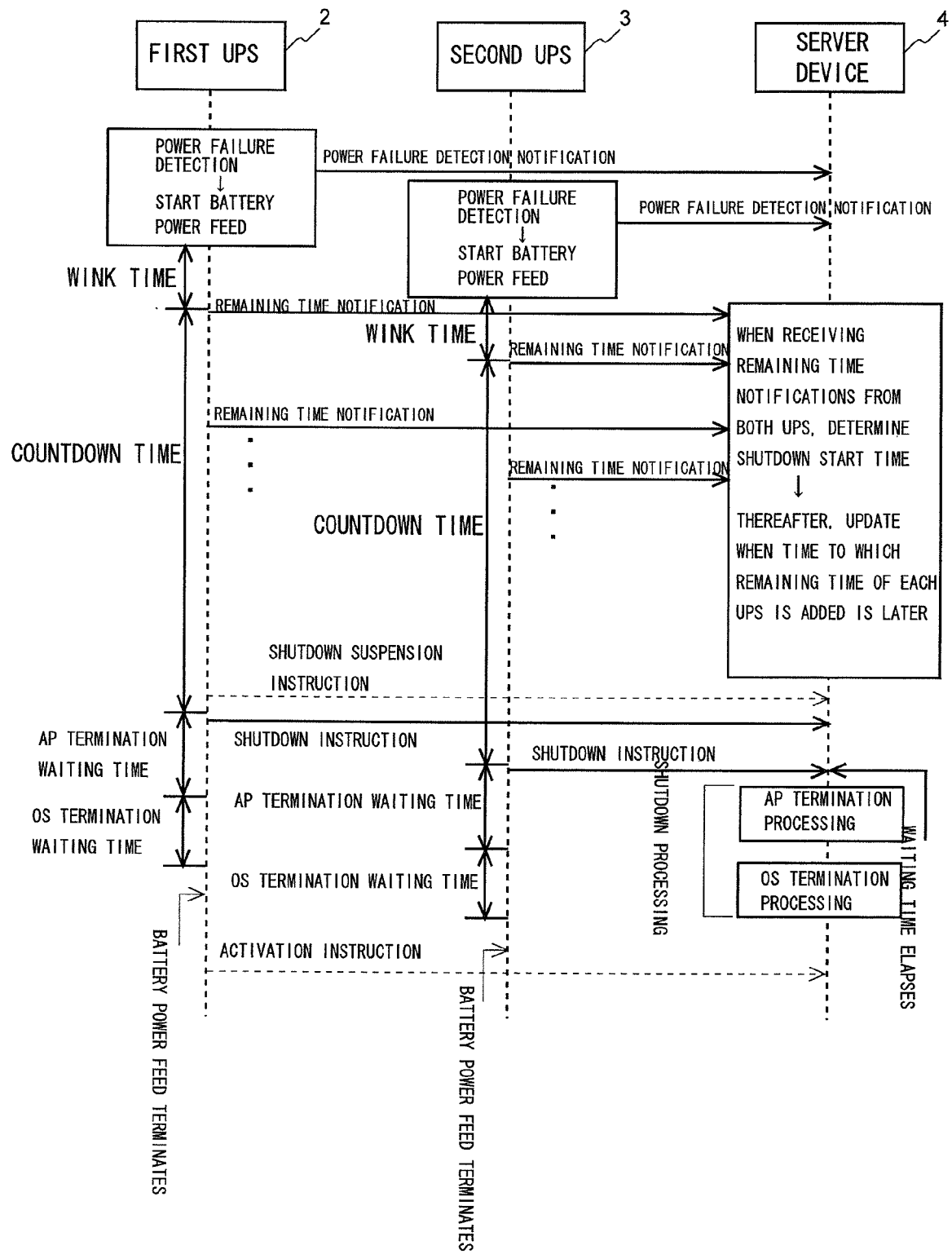
FIG. 6 is a flowchart showing the flow of the operation in a power feed priority mode.

FIG. 6 is a flowchart showing the flow of the operation when the shutdown mode data 22 stored by the server device 4 is the value corresponding to the power feed priority mode. In FIG. 6, as in the case of FIG. 5, the second UPS 3 detects a power failure a little later than the first UPS 2. In the case of the power feed priority mode, the stop control part 31 of the server device 4 also individually receives the power failure detection notifications, the remaining time notifications before start of shutdown, the shutdown instructions, the shutdown suspension instructions and the like from the first UPS 2 and the second UPS 3.

When the stop control part 31 of the server device 4 receives the first remaining time notification from the first UPS 2 or the second UPS 3, it confirms the shutdown mode. The shutdown mode is the power feed priority mode. When the stop control part 31 receives the remaining time notifications from both the first UPS 2 and the second UPS 3, it adds the remaining times of which it is notified to the respective times of the remaining time notifications, and determines the time that is later of the two times as the starting time of shutdown. When the stop control part 31 receives the remaining time notification from only one of the first UPS 2 and the second UPS 3, the stop control part 31 waits until it receives the remaining time notifications from all the uninterruptible power supplies.

When the stop control part 31 receives the second and the following remaining time notifications from the first UPS 2 and the second and the following remaining time notifications from the second UPS 3, it adds the received remaining times to the reception times. When the calculated time is later than the starting time of shutdown already determined, the stop control part 31 updates the starting time of shutdown to the newly calculated time. The stop control part 31 repeatedly executes the confirmation and update processing of the above each time it receives the second and the following remaining time notifications from the first UPS 2, and each time it receives the second and the following remaining time notifications from the second UPS 3.

By such a control, the stop control part 31 can determine the timing synchronized with the uninterruptible power supply which detects the power failure later as the starting time of shutdown irrespective of the sequence of reception of the remaining time notification from the first UPS 2 and the remaining time notification from the second UPS 3. Even when communication with the first UPS 2 and the second UPS 3 is disconnected, the stop control part 31 can execute the shutdown processing for itself under the power feed priority condition.

Concerning the shutdown instruction, the stop control part 31 starts the shutdown processing when receiving both the shutdown instruction of the first UPS 2 and the shutdown instruction of the second UPS 3. Thereby, the stop control part 31 can execute the shutdown processing under the power feed priority condition.

Concerning the shutdown suspension instruction, the stop control part 31 of the server device 4 suspends the shutdown processing when receiving one of the shutdown suspension instruction of the first UPS 2 and the shutdown suspension instruction of the second UPS 3. The stop control part 31 ignores the second shutdown suspension instruction. Thereby, the stop control part 31 can execute the shutdown processing under the power feed priority condition.

As above, the load notification parts 48 of the first UPS 2 and the second UPS 3 according to this embodiment provide notification of the remaining times before start of shutdown in the time period until the time period corresponding to the wink time and the countdown time stored in the memory 47 elapses after power abnormality of the AC power supplies 6 is detected. The load notification parts 48 provide notification via the general-purpose network 5 using the Internet protocol. The first UPS 2 and the second UPS 3 can provides notification of the remaining times by favorably using the waiting time until start of shutdown of the server device 4.

When the stop control part 31 of the server device 4 is notified of the remaining time until start of shutdown, it starts the shutdown processing when the remaining time elapses. Even when the hub device 7 stops at the point of time when the stop control part 31 starts the shutdown processing, and the stop control part 31 cannot receive the shutdown instructions from the first UPS 2 and the second UPS 3, the stop control part 31 of the server device 4 can start the shutdown processing for itself. The server device 4 can properly terminate the shutdown processing before the first UPS 2 and the second UPS 3 stop power feed.

In this embodiment, the load notification parts 48 of the first UPS 2 and the second UPS 3 repeatedly cause the UPS communication sections 49 to provide notification of the remaining time until start of shutdown in the time period corresponding to the countdown time stored in the memories 47 after power abnormality of the AC power supplies 6 is detected. The UPS communication sections 49 of the first UPS 2 and the second UPS 3 transmit the remaining time notifications before start of shutdown by a UDP/IP packet which does not need retransmission control.

Accordingly, the remaining time notifications are transmitted to the server device 4 from the first UPS 2 and the second UPS 3 a plurality of times. Even if some of the remaining time notifications are not received by the server device 4, the server device 4 can start the shutdown processing in proper timing. Notifications of the remaining times are transmitted to the server device 4 when the load notification parts 48 of the first UPS 2 and the second UPS 3 are to notify the server device 4 of the remaining time. Notification of the remaining time is not transmitted late due to retransmission control. As a result, the server device 4 can start the shutdown processing for itself in substantially the same timing as the time when the first UPS 2 or the second UPS 3 determines start of shutdown. The server device 4 can properly terminate the shutdown processing before the first UPS 2 and the second UPS 3 stop power feed.

In this embodiment, when the AC power supplies 6 are restored before the time period corresponding to the wink time and the countdown time stored in the memory 47 elapses, the load notification parts 48 of the first UPS 2 and the second UPS 3 notify the stop control part 31 of the server device 4 of suspension instructions of shutdown. In this timing, the stop control part 31 of the server device 4 does not start the shutdown processing. Accordingly, when the power supply is restored from the power failure in a short time within the time period corresponding to the wink time and the countdown time, the server device 4 can continuously operate without being shut down.

In this embodiment, the memories 47 of the first UPS 2 and the second UPS 3 store the AP termination waiting time and the OS termination waiting time until the server device 4 terminates shutdown after it starts shutdown. When the AC power supply 6 is restored after the time corresponding to the wink time and the countdown time elapses after power abnormality of the AC power supply 6 is detected, the load notification part 48 notifies the server device 4 of an activation instruction after the AP termination time and the OS termination time elapse. Accordingly, the server device 4 is immediately reactivated with the minimum stop time after power supply is restored from the power failure, and continuously operates with the minimum shutdown time period. The server device 4 operates substantially continuously for over a long period of time.

In this embodiment, the memory 19 of the server device 4 stores the shutdown mode data 22. When the stop control part 31 of the server device 4 is notified of the remaining time, the stop control part 31 judges whether the shutdown mode stored in the memory 19 is established or not, and when it judges that it is established, it determines the starting time of the shutdown processing. Even when the first UPS 2 and the second UPS 3 are connected to the server device 4 (even when a plurality of uninterruptible power supplies are connected), the server device 4 can properly execute the shutdown processing by the correct mode operation in accordance with the shutdown mode stored by the memory 19.

In this embodiment, the stop control and activation control of the server device 4 in the case where the AC power supply 6 fails are described. In addition to this, for example, the load notification parts 48 of the first UPS 2 and the second UPS 3 may transmit shutdown instructions and activation instructions based on activation and stop schedules not shown which are stored in the memories 47 of them. Further, the load notification parts 48 of the first UPS 2 and the second UPS 3 may transmit shutdown instructions and activation instructions based on the activation and stop instructions from a network server unit (a server unit by, for example, the telnet) not shown of the first UPS 2 and the second UPS 3. When the stop control part 31 of the server device 4 receives the first shutdown instruction, it may start shutdown processing, and when it receives the first activation instruction, it may start activation processing. Thereby, the server device 4 can activate and stop based on the schedule and a user instruction irrespective of setting of the shutdown mode.

In addition to this, the stop control part 31 of the server device 4 may notify the load notification parts 48 of the first UPS 2 and the second UPS 3 that the server device 4 activates at the time of its activation, for example. When the respective power feed units 41 are in the state without power feed, the load notification parts 48 of the first UPS 2 and the second UPS 3 transmit shutdown instructions to the stop control part 31. Thereby, even if the server device 4 to be supplied with power from the first UPS 2 and the second UPS 3 is activated by being connected to the other power supply than them, the server device 4 can be forcefully stopped. The server device 4 can be prevented from continuing to be activated in the state in which uninterruptible power feed by the first UPS 2 and the second UPS 3 is not possible.

The above embodiment is an example of a preferred embodiment of the present invention, but the present invention is not limited to this, and various modifications and changes can be made within the range which does not depart from the spirit of the invention.

For example, in the above described embodiment, the UPS communication sections 49 of the first UPS 2 and the second UPS 3 transmit the remaining times by the UDP/IP packet which does not need retransmission control. In addition to this, for example, the UPS communication section 49 may provide notification of the remaining time by the TCP/IP packet with limitation on the number of retransmission times or the retransmission time. By limiting the number of retransmission times or retransmission time, the remaining time notification by the TCP/IP packet is transmitted to the server device 4 when the load notification parts 48 of the first UPS 2 and the second UPS 3 are to notify the server device 4 of it.

In the above described embodiment, the server device 4 as the load device has the two power units 11, and the first UPS 2 and the second UPS 3 are connected to the two power supply units 11. Other than this, for example, the server device 4 may have one power supply unit 11, or three or more power supply units 11. The number of uninterruptible power supplies which feed power to the server device 4 may be one or three or more.

In the above described embodiment, the first UPS 2 and the second UPS 3 feed power to the server device 4. Other than this, for example, the first UPS 2 and the second UPS 3 may feed power to various kinds of network devices and the like having personal computers and microcomputers.

In the above described embodiment, the computer system 1 in which the two uninterruptible power supplies (the first UPS 2 and the second UPS 3) are connected to the one load device (server device 4) is shown as an example. The power feed system to the load device is made redundant by a plurality of uninterruptible power supplies being connected to the load device. Other than this, for example, the system configuration in which a plurality of uninterruptible power supplies respectively feed power to a plurality of load devices may be adopted.

Figure 7:
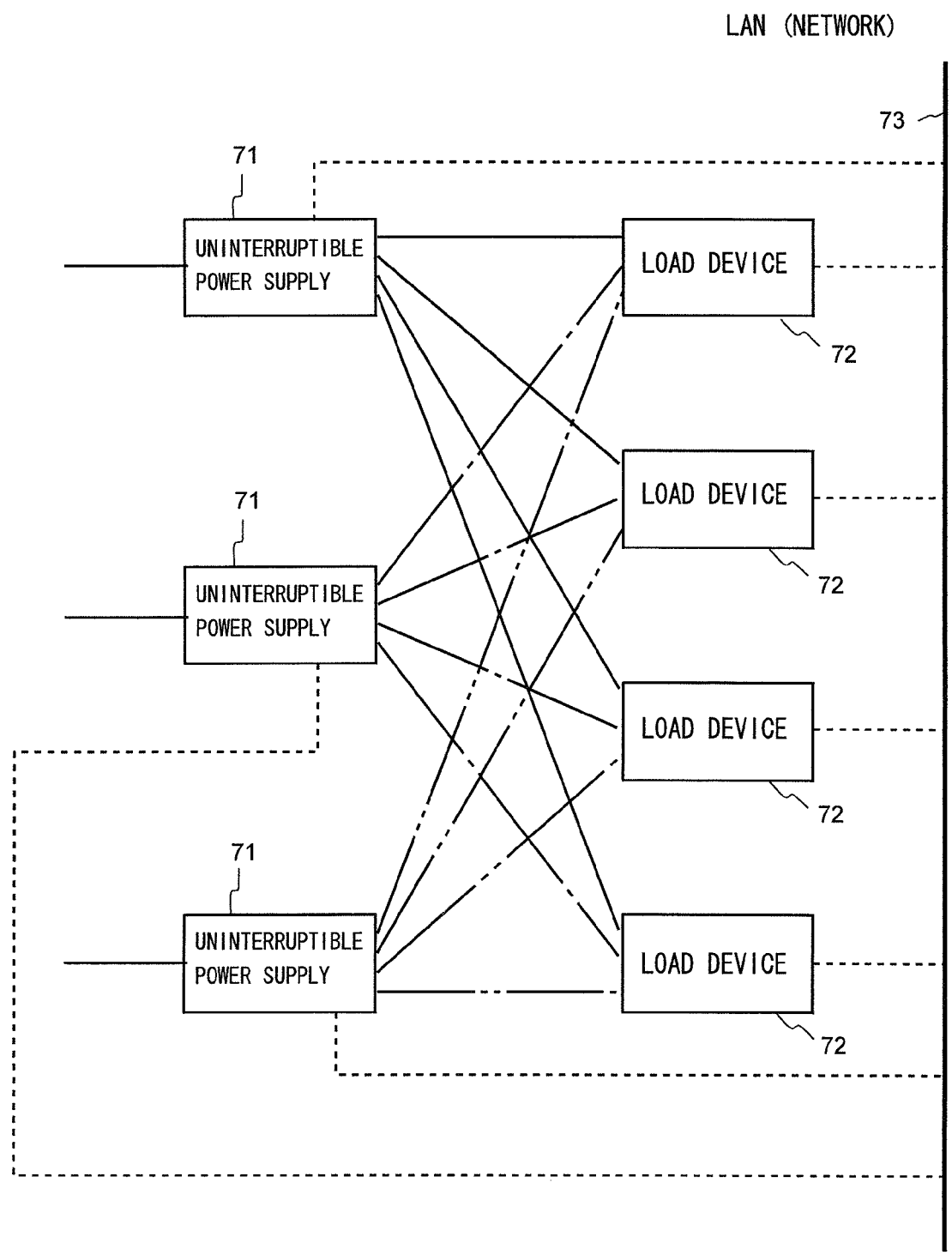
FIG. 7 is a system configuration diagram in a modification example having three uninterruptible power supplies and four load devices.

FIG. 7 is a system configuration diagram in an modification example constituted of three uninterruptible power supplies 71, 71 and 71 and four load devices 72, 72, 72 and 72. Each of the uninterruptible power supplies 71 feed power to the four load devices 72, 72, 72 and 72. The three uninterruptible power supplies 71 feed power to the common four load devices 72, 72, 72 and 72.

With such a complicated system configuration, by connecting the three uninterruptible power supplies 71, 71 and 71 and the four load devices 72, 72, 72 and 72 respectively to the network 73, the shutdown control and restoration control can be easily realized among them. Each of the uninterruptible power supplies 71 transmits a power failure notification, the remaining time until start of shutdown processing, a shutdown start instruction, and an activation instruction independently from the other uninterruptible power supplies 71 and 71, and each of the load devices 71 can carry out the shutdown processing and the like in accordance with its mode setting independently from the other load devices 72, 72 and 72. Each of the load devices 72 can be properly activated and stopped by the shutdown processing and the like in accordance with its mode setting.

More specifically, for example, after all the uninterruptible power supplies 71, 71 and 71 which perform a redundant operation are connected to the network 73, the above described stop control part 31 is realized in each of the load devices 72. Then, from the stop control parts 31, registration requests are transmitted to the above described load notification parts 48 of a plurality of uninterruptible power supplies 71, 71 and 71 which feed power. In this registration request, the stop control part 31 of each of the load devices 72 specifies the IP address and the like of a plurality of uninterruptible power supplies 71, 71 and 71, for example. The load notification part 48 stores the IP addresses and the like of the stop control parts 31 of all the load devices 72, 72, 72 and 72 which transmit the registration request notifications.

Thereafter, when the load notification part 48 of each of the uninterruptible power supplies 71 detects a power failure, it transmits a power failure notification, the remaining time until start of shutdown processing, a shutdown start instruction, an activation instruction and the like to the stop control parts 31 of all the load devices 72, 72, 72 and 72 which are already registered. The load notification part 48 may transmit the power failure notification and the like individually by specifying their IP addresses and the like to the stop control parts 31 of all the load devices 72, 72, 72 and 72 which are already registered. The stop control part 31 of each of the load devices 72 individually executes the shutdown processing and the like of its own device 72 in accordance with its mode setting.

Even with such a complicated system configuration, it is not necessary to provide the same number of communication ports as the number (four in FIG. 7) of load devices 72, 72, 72 and 72 to be supplied with power in each of the uninterruptible power supplies 71, or it is not necessary to connect it individually to a plurality of load devices 72, 72, 72 and 72. Similarly, it is not necessary to provide in each of the load devices 72 the same number (three in FIG. 7) of serial ports as the number of a plurality of uninterruptible power supplies 71, 71 and 71 which are made redundant. The uninterruptible power supply 71 and the load device 72 each only have to have one communication I/F 16 (61) as in the case where they are connected one-to-one. By one communication I/F 16 (61), communication for power feed control in the redundant power supply system of the complicated configuration as shown in FIG. 7 as an example can be easily realized.

The present invention can be used in an uninterruptible power supply connected between an AC power supply and a load device, and an uninterruptible power supply system using it.

What is claimed is:

1. An uninterruptible power supply connected to between an AC power supply and a load device(s), comprising:
a communication means that communicates with the load device to which the uninterruptible power supply itself feeds power, via a network;
a UPS storage means that stores a waiting time until the load device starts shutdown after it is notified of detection of power abnormality of the AC power supply; and
a notification means that causes said communication means to provide notification of a remaining time until start of shutdown, in a time period until a time period corresponding to the waiting time stored in said UPS storage means elapses after the power abnormality of the AC power supply is detected.

2. The uninterruptible power supply according to claim 1, wherein said notification means repeatedly causes the communication means to provide notification of the remaining time until start of shutdown, in the time period until the time period corresponding to the waiting time stored in said UPS storage means elapses after the power abnormality of the AC power supply is detected.

3. The uninterruptible power supply according to claim 1, wherein said communication means provides notification of the remaining time until start of shutdown by a packet which does not need retransmission control or a packet with limitation on a number of retransmissions or retransmission time.

4. The uninterruptible power supply according to claim 1, wherein when the AC power supply is restored before the time period corresponding to the waiting time stored in said UPS storage means elapses, said notification means causes said communication means to provide notification of a shutdown suspension instruction.

5. The uninterruptible power supply according to claim 1, wherein said UPS storage means stores shutdown time until the load device(s) terminates shutdown after it starts shutdown; and
wherein when the AC power supply is restored after the time period corresponding to the waiting time stored in said UPS storage means elapses after the power abnormality of the AC power supply is detected, said notification means causes said communication means to provide notification of an activation instruction to the load device(s), after the shutdown time elapses.

6. The uninterruptible power supply system, comprising:
said uninterruptible power supply according to claim 1;
a network to which said communication means of said uninterruptible power supply is connected; and
a shutdown processing means that is provided in a load device(s) to which power is fed by said uninterruptible power supply and which is connected to the network, and starts shutdown processing when a remaining time elapses, when it is notified of the remaining time until start of shutdown by said uninterruptible power supply.

7. The uninterruptible power supply system according to claim 6, wherein said network uses the Internet protocol.

8. The uninterruptible power supply system according to claim 6,
wherein said network has a network device(s) which is operated by power feed, and transmits a remaining time until the shutdown is started.

9. The uninterruptible power supply system, comprising:
a plurality of said uninterruptible power supplies according to claim 1;
a network to which a plurality of said communication means of a plurality of said uninterruptible power supplies are connected;
a load storage means that is provided in a load device(s) to which power is fed by a plurality of said uninterruptible power supplies and which is connected to the network, and stores one shutdown mode of a power feed priority mode which starts shutdown when all of a plurality of said uninterruptible power supplies detect power abnormality of AC power supplies, and a shutdown priority mode which starts shutdown when one of a plurality of said uninterruptible power supplies detects power abnormality of the AC power supply;
a determination means that is provided in the load device(s), judges whether or not the shutdown mode stored by said load storage means is to be established when it is notified of remaining times until start of the shutdown by a plurality of said uninterruptible power supplies, and determines starting time of shutdown processing when the shutdown mode is to be established; and
a shutdown processing means that is provided in the load device(s), and starts shutdown processing at the starting time determined by said determining means.

10. The uninterruptible power supply system according to claim 9,
wherein said network uses the Internet protocol.

11. The uninterruptible power supply system according to claim 9,
wherein said network has a network device(s) which is operated by power feed, and transmits a remaining time until the shutdown is started.

12. A computer readable program product for shutdown processing, which causes a computer to which power is fed by an uninterruptible power supply and which is connected to a network that is notified of a remaining time until start of shutdown by the uninterruptible power supply to realize
a determining means that determines starting time of shutdown processing based on the remaining time of which it is notified; and
a shutdown processing means that starts shutdown processing at the starting time determined by said determining means.

* * * * *